Figure 1:
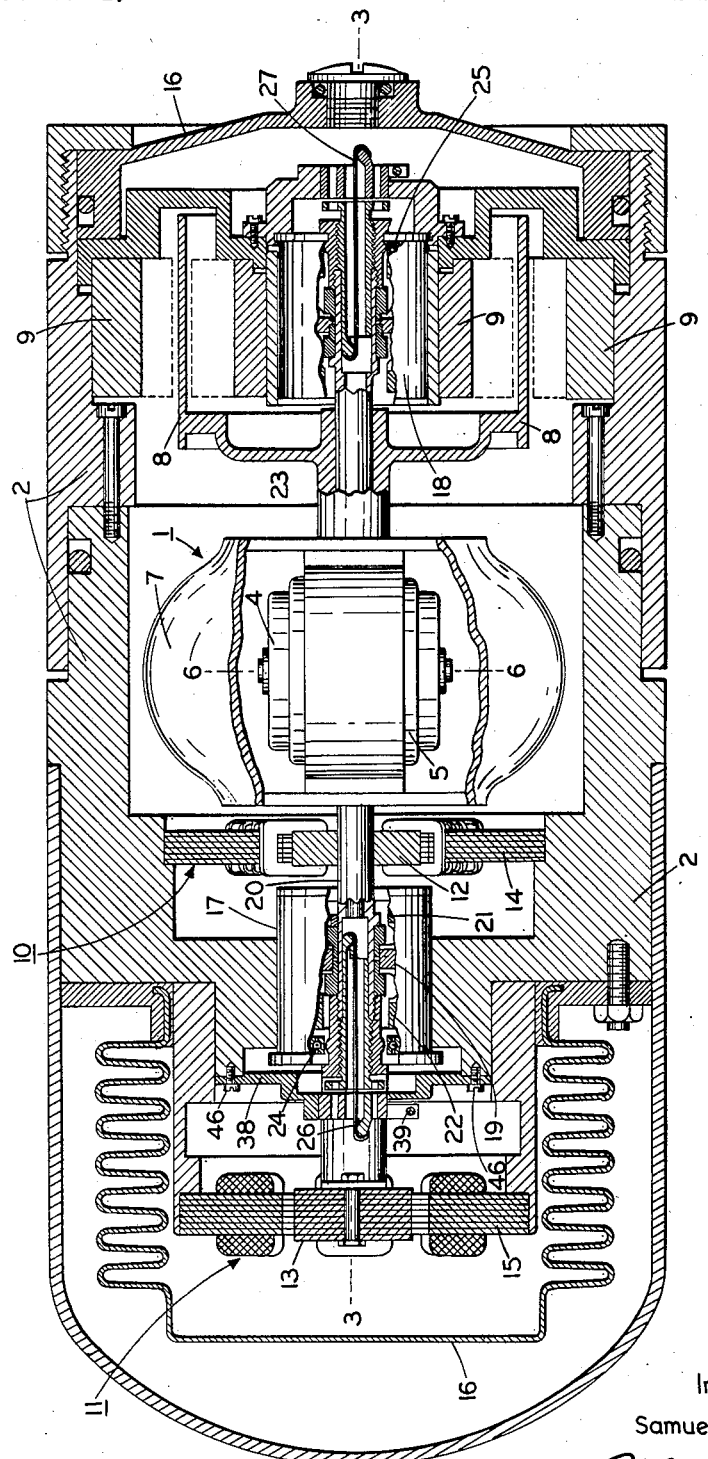

Inventor:
Samuel Gabrielson
by, Richard E. Hosley
His Attorney

April 1, 1958     S. GABRIELSON     2,828,627
AXIAL SUPPORT ARRANGEMENT
Filed Nov. 1, 1955     2 Sheets-Sheet 2

Inventor:
Samuel Gabrielson
by, Richard E. Hosley
His Attorney

United States Patent Office 2,828,627
Patented Apr. 1, 1958

2,828,627

AXIAL SUPPORT ARRANGEMENT

Samuel Gabrielson, Lynnfield, Mass., assignor to General Electric Company, a corporation of New York Application November 1, 1955, Serial No. 544,211

8 Claims. (Cl. 74—5)

The present invention relates to improved axial support arrangements of the torsion-wire type and, more particularly, to pre-assembled torsion-wire units which may be readily and simply utilized in the precision axial alignment of suspended apparatus such as single-axis gyroscopes.

It has been well known that torsion wires may be used advantageously to secure accurate axial alignment of angularly movable shafts, thereby obviating the need for thrust bearings in which undesirable friction characteristics might appear. In some apparatus, such torsion wires aid in preserving not only axial but also radial alignment as well. Principal difficulties with such suspensions are found in their assembly, disassembly and adjustment, particularly when they are employed with highly sensitive and delicate instruments.

Through practice of the present teachings, each torsion-wire element is embodied in a pre-assembled unit or capsule in which a predetermined value of wire tension is maintained. This capsule is adapted to be coupled between a rotatable element and its support in a simple manner and to exercise its predetermined tension between these parts when set in place. Removal of such capsules and their replacement by others, which can be stocked as supply parts, is achieved with equal facility and without disturbing the associated apparatus.

It is thus one of the objects of this invention to provide improved axial support arrangements, of the torsion-wire type, wherein accurate assembly and adjustment are facilitated.

A further object is to provide torsion-wire type bearing units which are pre-assembled and accurately pre-loaded and which may be readily and simply applied to the axial suspension of rotatable members.

By way of a summary account of one aspect of this invention, there is provided a member mounted on a support for relative angular movement about a given axis, a sensitive low-friction bearing arrangement being employed to preserve radial alignment about the support axis. Axial alignment of the angularly movable member along the support axis is afforded by two spaced torsion wires each coupled between the member and its support and each somewhat strained to exert equal axial aligning forces upon the movable member in opposite directions. The torsion wires are elements of independent units which are pre-assembled and pre-stressed to establish the desired wire tautness, one end of each wire being fixed with a first part which attaches to the movable member and the other and spaced end of each wire being fixed with a second part which attaches to the relatively fixed support. Prior to and during attachment of the torsion-wire units to the relatively movable member and support, these two parts of each unit are spaced apart by a shim, which preserves a predetermined wire tension, and are fixed together by suitable fasteners which preclude relative movement between the parts. Upon assembly of the units with the relatively movable member and support, the fasteners and shims are removed, leaving the axial support to the torsion wires alone. The pre-set wire tensions are preserved.

Figure 2:
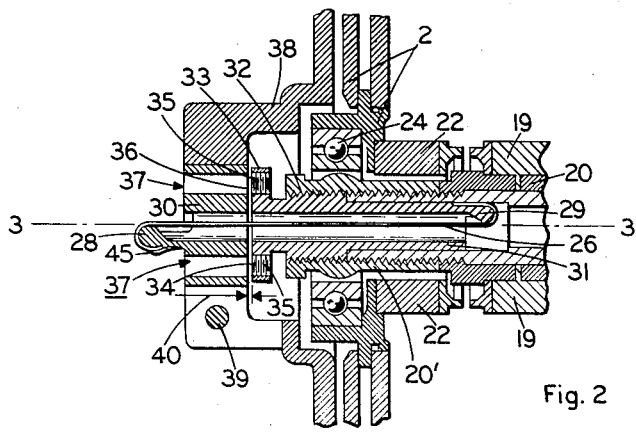
Figure 3:
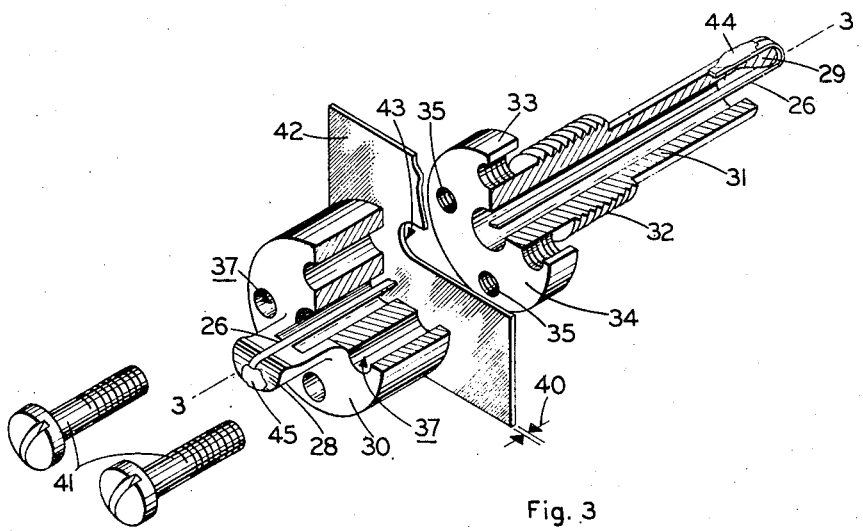

Although the features of this invention which are believed to be novel are set forth in the appended claims, further objects and advantages are revealed in the following description made with reference to the accompanying drawings, wherein:

Figure 1 is a cross-sectional view of a single-axis gyroscope embodying my improved suspension;

Figure 2 provides a longitudinal cross-section of a torsion-wire unit in assembled relationship with relatively movable members; and Figure 3 is a partially exploded view of a torsion-wire unit together with its associated shim and fasteners.

One arrangement for practicing this invention is exemplified by the gyroscopic apparatus of Figure 1, which is of the single-axis type in that the rotor structure 1 is angularly movable in the frame 2 about a single suspension axis 3—3. Rotor structure 1 supports rotor halves 4 and 5 which are electrically rotated at high speed about the spin axis 6—6 within a sealed container 7. Gyroscopic inertia is developed in the usual manner about the spin axis 6—6, and angular movements of frame 2 about an axis mutually perpendicular to the spin axis 6—6 and support axis 3—3 occasion precession of structure 1 about the latter axis. Gyroscopes of this type are damped in angular movement about their support axes, and for this purpose, a cup-shaped conductive member 8 is affixed with rotor structure 1 coaxially about the support axis and interacts with the magnetic field established by permanent magnets 9 affixed to the frame 2. Eddy-currents induced in member 8 by the high-intensity fields from magnets 9 cause restraint of relative angular movement between the outer frame 2 and rotor structure 1. In one of its uses, the single-axis gyroscope includes an electrical pick-off 11 and a torque motor 10, each of which has a rotor element, 13 and 12, respectively, fixed in angular relation to the rotor structure 1, and a stator, 15 and 14, respectively, fixed in relation to the outer frame 2. Movements of frame 2 about an axis perpendicular to both axes 3—3 and 6—6 will result in precession of rotor structure 1 about axis 3—3, such that pick-off 11 will detect the precession and produce electrical output signals characterizing its direction and magnitude. In turn, these signals may be used to actuate servos or other apparatus for reorienting the gyroscope frame. Aboard an aircraft, the pick-off signals would occasion stabilization of the craft in flight, for example. Torque motor 10 may be excited to drive the rotor structure 1 in one or the other angular direction about axis 3—3 and, thereby, to orient the spin axis 6—6 properly whenever necessary.

Suspension of the rotor structure and its affixed elements in the outer frame for relative movement about the support axis 3—3 is achieved by flotation, radial magnetic suspension, radial shock bearing, and axial torsion-wire bearing units. Spaces intermediate the sealed rotor container 7 and the fluid-tight housing elements 16 are filled with a non-viscous fluid which buoys the container 7 and provides a substantially neutral or balanced buoyancy of the rotor structure and the parts fixed to it. Radial support is further supplied by the frictionless radial magnetic suspensions housed within the spaced cylindrical cartridges 17 and 18. For example, cartridge 17 includes an annular magnet 19, which is mounted on a support shaft 20 of rotor structure 1, and a pair of annular magnets 21 and 22, are fixed with the outer frame 2 on either side of the central magnet 19. Small gaps separate the adjacent shaped magnets, such that there is no frictional contact between them, and the adjacent magnets attract one another. These attractive forces tend to maintain radial alignment of the shaft 20 about support axis 3—3 in a known manner. Cartridge 18 is of like construction, and the rotor structure end shaft 23 is thus similarly provided with radial magnetic support about axis 3—3. Because of the resiliency exhibited by magnetic suspensions, the further load bearings 24 and 25 are provided between the shafts 20 and 23 and the frame 2, although these relatively high friction bearings are effective only when shocks or other severe loads cause these shafts to engage the bearings by moving across the gaps normally separating them. If desired, further detail of the aforedescribed flotation, magnetic suspension, and shock bearings may be found in the disclosures of the copending application of John E. Lundberg, Serial No. 400,000, filed December 23, 1952, for "Single Axis Gyroscope," the assignee thereof being the same as that of the present application.

Radial magnetic suspensions possess instability axially along their suspension axes, and it is therefore necessary that end-thrust bearings be provided. In the case of high-precision gyroscopic instruments, such as that of Figure 1, even the slight axial movement permitted by conventional end-thrust bearings may introduce inaccuracies, and the friction characteristics of such bearings may impose serious limitations upon gyroscope performance. Torsion wires effectively avoid these friction problems and may introduce only very minute torques about the suspension axis. For example, rotor structure 1 in Figure 1 is intended to move only through a few degrees, at most, about the support axis 3—3, such that torsion wires 26 and 27 may be utilized in its suspension without developing appreciable torque. Wires 26 and 27 are slender, formed of material which yields only low torque under torsion, and of sufficient length to further minimize torsion-induced torques. They lie longitudinally along the support axis 3—3 and each has one end fixed with the frame 2 and another end fixed with a different one of the rotor structure end shafts 20 and 23. End-play or axial movement of rotor structure 1 along axis 3—3 is precluded only if no slack appears in wires 26 and 27, and preferably, these wires are under a sufficient amount of tension to prevent the appearance of such slack.

The assembly, adjustment, and disassembly of torsion wires can be exceedingly difficult if the slender wires are each independently affixed to the relatively movable parts in separate operations. Tensioning and axial, radial, and angular alignment are criitcal, and inaccuracies in these respects cannot be tolerated. For these reasons, wires 26 and 27 are each included in a unique sub-assembly, the detailed features of which appear in Figures 2 and 3. There, only support wire 26 is portrayed in its sub-assembly, although it will be appreciated that the unit including support wire 27 is of like construction.

Referring to the Figure 2 detailed illustration of wire 26 in its relationship to parts of the gyroscopic instrument of Figure 1, it is noted that this wire is stretched between opposite ends 28 and 29 of two hollow and spaced collinear members 30 and 31, respectively. Member 31 is of elongated tubular form, with one portion thereof, 32, threaded externally and mated with an extension 20' of the rotor structure end shaft 20. The portion of member 31 which is disposed adjacent member 30 is provided with an enlarged shoulder 33 having a planar surface 34 normal to the longitudinal axis of member 31 and also having a pair of tapped holes 35. Hollow-cylindrical member 30 has a like planar surface 36 which is disposed parallel with surface 34. Untapped holes 37 in member 30 are aligned with holes 35 in member 31, the purpose of these holes being clarified later herein. End portion 28 of member 30 projects outwardly to afford an accessible anchor and resting position for one end of wire 26, and the corresponding end portion 29 of member 31 is similarly arranged. Member 30 is received within an accommodating bore in the slotted end bracket 38, which is fixed with the instrument frame 2, and the sides of this bracket adjacent the slotted portion thereof may be drawn together with the aid of a stud 39 such that member 30 is rigidly affixed to frame 2. With member 30 so fixed, and with member 31 threaded tightly onto the rotor structure end shaft 20, a small clearance gap 40 appears between the planar surfaces 34 and 36 of the two members. The rotor structure 1 and instrument frame 2 are thus rendered relatively movable about the suspension axis 3—3, with end thrust in one direction precluded by wire 26 and end thrust in the opposite direction precluded by wire 27 of the opposite suspension unit.

The partly exploded view in Figure 3 aids in a further understanding of practice of the invention. The two members 30 and 31 are fastened together in a predetermined angular and spaced axial relationship by the two dowel screws 41 which pass through the holes 37 and are threaded into holes 35. Intermediate the planar surfaces 36 and 34 is disposed a thin flat slotted shim 42, of about the same thickness as the clearance gap 40 which is to be provided between the members 30 and 31. Screws 41 are drawn up firmly such that shim 42 is held in place between members 30 and 31, and an elongated slot 43 in shim 42 permits the torsion wire 26 to pass straight through from the end 29 of member 31 to the end 28 of member 30. One end of wire 26, say the end connected with member 31, is wrapped around the end portion 29 in a shallow locating groove (not visible in the illustrations) and is soldered to the member 31 at position 44. The opposite end is then pulled taut about the end portion 28 of member 30 and is soldered thereto at position 45 while the wire tension is maintained. One advantageous technique for establishing a predetermined wire tension has been to attach a predetermined weight to this other wire end while the soldering at position 45 is performed. With wire 26 in the form of a flat ribbon, it is simple to eliminate initial biasing torques about axis 3—3 merely by visually ascertaining that the ribbon 26 is untwisted when the aforesaid soldering, or other fastening, is achieved. Wire of circular cross-section may of course be used, however. End portions 28 and 29 may either be machined, as shown, or bent such that wire 26 will lie accurately along the longitudinal axis 3—3, and their radially innermost parts lie essentially along the longitudinal axes of the hollow bores through their respective members 30 and 31. Each of the units or capsules so assembled can be stocked as a spare part, since each will possess a predetermined tension and accurate radial and angular alignment between its support parts.

In assembling a torsion-wire unit with the gyroscope of Figures 1 and 2, the unit with its shim fastened in place is screwed firmly into the internally-threaded end shaft, for example into the end shaft extension 20'. Next, the frame bracket 38 is slipped over the member 30, is fastened to frame 2 by means such as bolts 46 (Figure 1), and is then clamped rigidly with members 30 by a tightening of the bolt 39. Dowel screws 41 are removed after both torsion-wire units have been installed in this manner, and the removable shims or spacing gauges, such as spacer 42, are then pulled from between the two support members of each torsion-wire unit. The rotor structure 1 is thus left in accurate suspension, there being no angular twisting or axial end-play about the support axis 3—3. Removal of any unit is readily accomplished by unclamping and unbolting the associated end bracket, re-inserting the spacer or shim, inserting and tightening the dowel screws, and unscrewing the unit from the rotor structure end shaft.

Those skilled in the art will appreciate that the aforedescribed apparatus may be modified in many respects without departing from practice of the present teachings. For example, the torsion wire may be of any desired cross-sectional shape and may be of sufficient size to introduce pronounced torques about the support axis, where such torques are useful. Accurate pre-twisting of the wires by predetermined amounts can also be realized, and more than one wire may be utilized in each unit when their combined effects are desired. By shaping or bending a shim such that it is of lesser outer dimensions than the member which is to be clamped in an end bracket, the entire torsion-wire unit with shim in place may be inserted into and removed from its operating position without involving movement of the end bracket. While the two members of each torsion-wire unit have been described as adapted for threading or clamping into relatively movable parts, other fastening arrangements can obviously be employed.

Thus, it should be clear that various substitutions and modifications can be effected without departure in spirit or scope from the invention set forth in the appended claims.

What I claim as new and desire to secure by Letters Patent of the United States is:

1. In an instrument having a structure angularly movable in relation to a support, a pair of units for suspending said structure in said support about an axis, each of said units comprising a torsion wire, a first member fastened to said torsion wire near one end thereof, a second member fastened to said torsion wire near the other end thereof, a spacer shaped for insertion between and removal from between said first and second members, said members being fastened to said wire at positions near the ends thereof such that a predetermined tension is maintained in said wire when said spacer is positioned between said members, and means for fastening said members together in a predetermined angular relationship with said spacer between said members, and means for fastening said first and second members of said units to said structure and support, respectively, with the torsion wires thereof in alignment with said axis, whereby upon loosening of the fastening means and removal of the spacers of said units said structure is oriented angularly and axially about said axis by the torsion wires of said units.

2. In an instrument having a structure angularly movable in relation to a support, a pair of units for suspending said structure in said support about an axis, each of said units comprising a torsion wire, a first member fastened to said torsion wire near one end thereof, a second member fastened to said torsion wire near the other end thereof, said first and second members having juxtaposed gauging surfaces disposed intermediate the ends of said wire and normal to said wire, a spacer gauge shaped for insertion between and removal from between said gauging surfaces of said members, said members being fastened to said wire and said spacer gauge having dimensions such that a predetermined tension is maintained in said wire when said spacer gauge is positioned between said members, and adjustable fastening means for selectively disconnecting said members and connecting said members together in a predetermined angular relationship with said spacer gauge between said surfaces, and means for fastening said first and second members of said units to said structure and support, respectively, with the torsion wires thereof in alignment with said axis, whereby upon disconnecting of said members and removal of the spacer gauges of said units said structure is oriented angularly and axially about said axis by the torsion wires of said units.

3. In an instrument having a structure angularly movable in relation to a support about a suspension axis, a pair of suspension units adapted for connection between said structure and support at spaced positions along said suspension axis, each of said units comprising a torsion wire, a first elongated hollow cylindrical member anchoring said wire near one end thereof at a position near one end of said member along the longitudinal axis of said member, a second member disposed collinearly with said cylindrical member near the other end thereof and fastened to said wire near the other end of said wire, said members having juxtaposed planar surfaces intermediate the ends of said wire and normal to said longitudinal axis, a flat spacer gauge shaped for insertion between and removal from between said planar surfaces of said members, said members being fastened to said wire and said spacer gauge having a thickness such that a predetermined tension is maintained in said wire when said spacer gauge is positioned between said members, and adjustable fastening means for selectively disconnecting said members and connecting said members together in a predetermined angular relationship with said spacer gauge between said surfaces, and means for fastening said first and second members of said units to said structure and support, respectively, with the torsion wires and longitudinal axes thereof in alignment with said suspension axis, whereby upon disconnecting of said members and removal of the spacer gauges of said units said structure is oriented angularly and axially about said suspension axis by the torsion wires of said units.

4. In an instrument having a structure angularly movable in relation to a support, magnetic suspension means radially supporting said structure in relation to said support about a suspension axis, a pair of torsion wire units for supporting said structure in said support axially along said suspension axis, each of said units comprising a torsion wire, a first member fastened to said torsion wire near one end thereof, a second member fastened to said torsion wire near the other end thereof, a spacer gauge shaped for insertion between and removal from between said first and second members, said members being fastened to said wire at positions near the ends thereof and said spacer gauge being dimensioned such that a predetermined tension is maintained in said wire when said spacer gauge is positioned between said members, and means for fastening said members together in a predetermined angular relationship with said spacer gauge between said members, and means for fastening said first and second members of said units to said structure and support, respectively, with the torsion wires thereof spaced axially along said suspension axis, whereby upon loosening of the fastening means and removal of said spacer gauges of said units said structure is oriented radially, angularly and axially about said suspension axis.

5. In a gyroscopic instrument having a gyro rotor, a rotor structure mounting said rotor for rotation about a spin axis and an outer support for mounting said rotor structure for angular movement about a support axis normal to said spin axis, a pair of units for suspending said rotor structure in said support about said support axis, each of said units comprising a torsion wire, a first member fastened to said torsion wire near one end thereof, a second member fastened to said torsion wire near the other end thereof, a spacer shaped for insertion between and removal from between said first and second members, said members being fastened to said wire at positions near the ends thereof such that a predetermined tension is maintained in said wire when said spacer is positioned between said members, and means for fastening said members together in a predetermined angular relationship with said spacer between said members, and means for fastening said first and second members of said units to said rotor structure and support, respectively, with the torsion wires thereof in alignment with said support axis, whereby upon loosening of the fastening means and removal of the spacers of said units said rotor structure is oriented angularly and axially about said axis by said torsion wires.

6. In a gyroscopic instrument having a gyro rotor, a rotor structure mounting said rotor for rotation about a spin axis, and an outer support for mounting said rotor structure for angular movement about a support axis normal to said spin axis, a pair of suspension units adapted for connection between said rotor structure and support at spaced positions along said support axis, each of said units comprising a torsion wire, a first member fastened to said torsion wire near one end thereof, a second member fastened to said torsion wire near the other end thereof, said members having juxtaposed gauging surfaces disposed intermediate the ends of said wire, a spacer gauge shaped for insertion between and removal from between said gauging surfaces, said members being fastened to said wire and said spacer gauge having dimensions such that a predetermined tension is maintained in said wire when said spacer gauge is positioned between said members, and adjustable fastening means for selectively disconnecting said members and connecting said members together in a predetermined angular relationship with said spacer gauge between said surfaces, and means for fastening said first and second members of said units to said rotor structure and support, respectively, with the torsion wires thereof spaced along said support axis, whereby upon disconnecting of said members and removal of the spacer gauges of said units said rotor structure is oriented angularly and axially about said support axis by the torsion wires of said units.

7. In a gyroscopic instrument having a gyro rotor, a rotor structure mounting said rotor for rotation about a spin axis, an outer support for mounting said rotor structure for angular movement about a support axis normal to said spin axis, magnetic suspension means radially supporting said rotor structure in relation to said support about said support axis, a pair of torsion wire units for supporting said structure in said support axially along said suspension axis, each of said units comprising a torsion wire, a first member fastened to said torsion wire near one end thereof, a second member fastened to said wire near the other end thereof, said members having juxtaposed parallel planar surfaces, a flat spacer gauge shaped for insertion between and removal from between said surfaces, said members being fastened to said wire and said spacer gauge being of a thickness such that a predetermined tension is maintained in said wire when said spacer gauge is positioned between said surfaces, and means for disconnecting said members and connecting said members together in a predetermined angular relationship with said spacer gauge between said surfaces, and means for fastening said first and second members of said units to said rotor structure and support, respectively, with the torsion wires thereof spaced along said support axis, whereby upon disconnecting of said members and removal of the spacer gauges of said units said rotor structure is oriented radially, angularly and axially along said support axis.

8. In a gyroscopic instrument as set forth in claim 7, the torsion wire units wherein said first member comprises a hollow cylindrical element which is externally threaded and which anchors said one wire end along the longitudinal axis of said element near one end thereof, wherein said angular connecting and disconnecting means comprises at least one screw cooperating with an aperture in said second member and a threaded opening in said first member, and the fastening means comprising internally threaded receptacles on said rotor structure cooperating with the externally-threaded cylindrical elements of said units and clamping means on said support cooperating with the second members of said units.

References Cited in the file of this patent
UNITED STATES PATENTS

| 1,226,882 | Henderson | May 22, 1917 |
| 1,501,886 | Abbot | July 15, 1924 |
| 1,797,913 | Henderson | Mar. 24, 1931 |
| 2,582,788 | Mendelsohn | Jan. 15, 1952 |